Figures 1, 2:
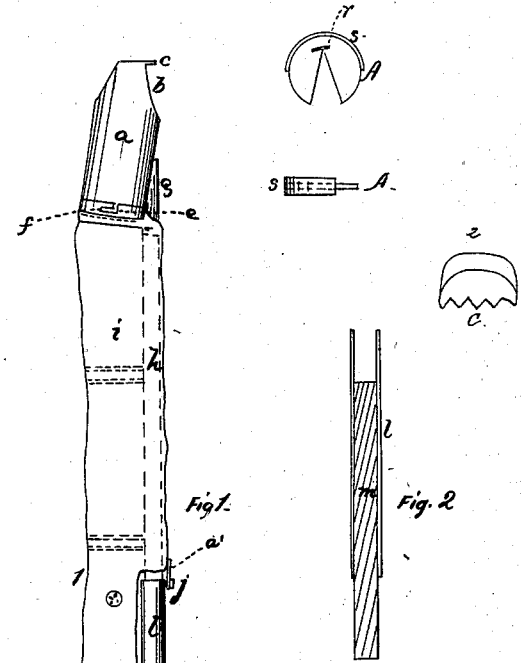

J. A. Knight.
Fruit-Picker.

№ 80,288.  Patented Jul. 28, 1868.

Witnesses.
Henry C. Houston
W. Frank Garey

Inventor
J. H. Knight
per atty W. H. Clifford

United States Patent Office.

JOHN A. KNIGHT, OF DURHAM, MAINE.

Letters Patent No. 80,288, dated July 28, 1868.

IMPROVEMENT IN FRUIT-PICKERS.

*The Schedule referred to in these Letters Patent and making part of the same.*

TO ALL WHOM IT MAY CONCERN:

Be it known that I, JOHN A. KNIGHT, of Durham, in the county of Androscoggin, and State of Maine, have invented a new and useful Improved Fruit-Picker; and I hereby declare the following to be a full, clear, and exact description thereof, which will enable others to make and use my invention, reference being had to the accompanying drawings, forming part of this specification, in which—

Figure 1 is a side elevation of my invention.

Figure 2, a detail of the extensible handle.

A is a face and side view of the rests in the tubes.

C is a top view of the head, showing the teeth.

I am aware of numerous patents on fruit-gatherers, having metallic heads to detach the fruit from the tree, a handle or rod, a flexible jointed tube or conductor, and a bag or receptacle to receive the fruit at the bottom, near the hand of the user. These I do not claim. But it is the purpose of my invention to claim an improved gatherer, combining other elements conducing to cheapness, utility, and convenience.

My fruit-gatherer is intended to be used by the operator standing on the ground, and the fruit is intended to be conducted down to him through the tube, as is the case with others.

I will now describe the component parts of my improvement.

$a$ is the head or detacher, having an opening, $b$, and serrated or toothed edge, $c$, to break off the fruit. The head is detachable at its junction with a ring having two right-angled slots, $e$, into which pins on the head work, by which the head $a$ can both be held in place and removed at pleasure.

The flexible tube $i$ is attached to the ring.

The pole or handle $d$ is attached to the head $a$ by fitting into a socket or tube, $g$, and is removable therefrom.

$h$ is a smaller cloth tube, passing around the pole, to keep the conducting-tube $i$ in position.

$j$ is a strap or tongue, to keep the smaller tube $h$ properly stretched along the pole $d$.

Below 1 the conductor $i$ is sparate from the pole, being attached by the strap $k$.

$h$ is formed of the same piece of material as the conductor $i$, and is passed around, or partly around, the pole, to keep the conductor in position.

At the bottom of the conductor is a bag, $y$, to receive the fruit.

$l$ is a hollow portion o the pole $a'$, to receive the sliding rod $m$, so that the length of the handle is adjustable to different heights of trees and the position of the fruit on the trees. A section of this is seen in fig. 2.

At certain distances within the tube are checks or rests, $p$, of leather or rubber, made as seen at A, having a tapering piece cut of of the same, and a small slit at $r$. These are set on a rim, $s$, which rim is secured to the inner periphery of the conductor. As the fruit falls into the conductor, it is received on these rests, and the force of the falls broken, so that, as it reaches the bag at the bottom, it is not bruised, as it would be if allowed to fall unchecked, particularly when fruit is already in the bag, for the successive gatherings to strike upon.

The pole is detachable from the head at $g$.

$u$ is a rod or strap, to keep the receiving-bag in place when the sliding rod $m$ is within $l$, and the bag is not held by strap $k$ passing around the same.

The operation is as follows:

The fruit detached by the edge $c$ drops into the conductor, striking upon the rests $p$, when, separating the edges of the tapering aperture by means of the slot $r$, it falls through, but with diminished force, on to the next rest, and so through the conductor, and at last drops gently into the bag at the bottom.

When no longer needed for use, the head $a$ is removed, by means of the pins of the head and the slots on the ring, the handle then removed from the head, the handle collapsed, the jointed tube removed, and thus the whole folded into a contracted space.

The conductor may be made of canvas, and the head of any convenient material.

When removed, the pole a' is drawn down through the small tube h, first releasing the strap k.

Disclaiming previous patents,

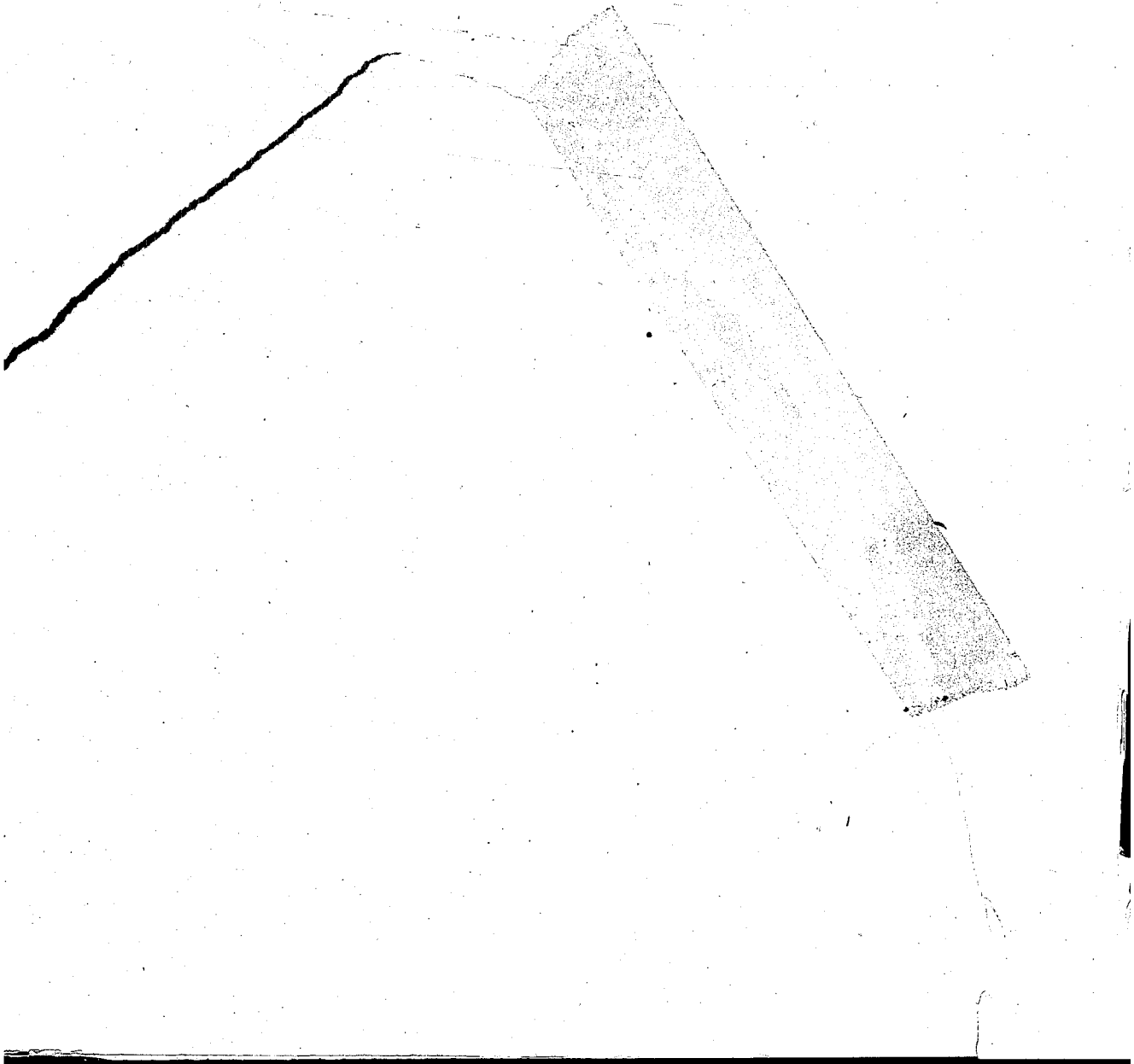

What I claim, and desire to secure by Letters Patent, is—

The fruit-gatherer, as described, combining the removable head a, edge or teeth c, handle or pole a', jointed conductor i, attached, as described, to the pole, and having the peculiarly-formed chucks p, as and for the purposes described.

JOHN A. KNIGHT.

Witnesses:
    Thomas C. Pinkham,
    William H. Johnson.